United States Patent
Ramos et al.

(10) Patent No.: US 12,124,801 B2
(45) Date of Patent: Oct. 22, 2024

(54) PRODUCT CONFIGURATION ANALYSIS AND ANOMALY PREDICTION USING MACHINE LEARNING

(71) Applicant: Dell Products L.P., Round Rock, TX (US)

(72) Inventors: Lisandro Ramos, Porto Alegre (BR); David J. Linsey, Marietta, GA (US); Bijan Kumar Mohanty, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 17/866,764

(22) Filed: Jul. 18, 2022

(65) Prior Publication Data

US 2024/0020475 A1    Jan. 18, 2024

(51) Int. Cl.
*G06F 40/20* (2020.01)
*G06F 40/279* (2020.01)
*G06N 20/00* (2019.01)
*G06Q 30/0601* (2023.01)

(52) U.S. Cl.
CPC .......... *G06F 40/279* (2020.01); *G06N 20/00* (2019.01); *G06Q 30/0623* (2013.01)

(58) Field of Classification Search
CPC .......... G06F 40/20; G06F 40/30; G06N 20/00
See application file for complete search history.

(56) References Cited

U.S. PATENT DOCUMENTS

| | | | |
|---|---|---|---|
| 10,282,237 B1 * | 5/2019 | Johnson | G06N 20/00 |
| 10,534,928 B1 * | 1/2020 | Roden | G06N 20/10 |
| 2022/0309390 A1 * | 9/2022 | Arnautov | G06F 18/10 |
| 2022/0351132 A1 * | 11/2022 | Tatituri | G06F 16/904 |

OTHER PUBLICATIONS

Wikipedia, "Isolation Forest," https://en.wikipedia.org/w/index.php?title=Isolation_forest&oldid=1029032059, Jun. 17, 2021, 7 pages.
Jeremy H. "4 Microservices Examples: Amazon, Netflix, Uber, and Etsy," https://blog.dreamfactory.com/microservices-examples/, Jul. 14, 2021, 12 pages.
J. Lewis et al., "Microservices: A Definition of This New Architectural Term," https://martinfowler.com/articles/microservices.html, Mar. 25, 2014, 32 pages.
A. Vaswani et al., "Attention Is All You Need," arXiv:1706.03762v5, Dec. 6, 2017, 15 pages.
U.S. Appl. No. 17/502,169, filed in the name of Bijan Kumar Mohanty et al. on Oct. 15, 2021, and entitled "Application Programming Interface Anomaly Detection."
U.S. Appl. No. 17/828,357, filed in the name of Bijan Kumar Mohanty et al. on May 31, 2022, and entitled "Microservices Anomaly Detection."

* cited by examiner

*Primary Examiner* — Daniel Abebe
(74) *Attorney, Agent, or Firm* — Ryan, Mason & Lewis, LLP

(57) ABSTRACT

A method comprises receiving product selection data, wherein the product selection data characterizes at least one combination of at least two products. In the method, the product selection data is analyzed using one or more machine learning algorithms. The method further comprises predicting based, at least in part, on the analyzing, whether the at least one combination is anomalous. One or more alerts are generated in response to predicting that the at least one combination is anomalous.

20 Claims, 20 Drawing Sheets

| Product SKU | Description | Duration Years | Category | Service Level | Anomalous |
|---|---|---|---|---|---|
| 123-1111 | 1 Year, ProSupport Plus 4 Hour | 1 | ProSupport Plus | 4 Hour | N |
| 123-2222 | 2 Years, ProSupport Plus 4 Hour | 1 | ProSupport | Next Business Day | Y |
| 123-3333 | 1 Year, Depot Repair | 1 | Basic | Depot | N |
| 456-4444 | Basic Laptop | | | | N |
| 456-5555 | High-end Storage Array | | | | N |

| Order Number | Product SKU | Description | Anomalous |
|---|---|---|---|
| 2 | 456-4444 | Basic Laptop | N |
| 2 | 123-3333 | 1 Year, Depot Repair | N |
| 3 | 456-5555 | High-end Storage Array | Y |
| 3 | 123-3333 | 1 Year, Depot Repair | Y |

400

```
!pip install keytotext
Requirement already satisfied: keytotext in c:\other\mytechnology\anaconda3\lib\site-packages (1.5.2)
Requirement already satisfied: datasets in c:\other\mytechnology\anaconda3\lib\site-packages (from keytotext) (1.18.3)
Requirement already satisfied: huggingface_hub in c:\other\mytechnology\anaconda3\lib\site-packages (from keytotext) (0.4.0)
Requirement already satisfied: wandb in c:\other\mytechnology\anaconda3\lib\site-packages (from keytotext) (0.12.10)
```

FIG. 4

```
from keytotext import pipeline
nlgModel = pipeline("k2t-base")  #loading the pre-trained model
params = {"do_sample":True, "num_beams":4, "no_repeat_ngram_size":3, "early_stopping":True}  #decoding params genSentence = nlgModel([['proSupportplus', 'Next Day Support', '12 months'], **params])  #keywords
print(genSentence)

proSupportplus has a next day support of 12 months.
```

```
from transformers import pipeline, set_seed
generator = pipeline('text-generation', model='gpt2')
set_seed(42)
sentence = generator("ProSupportPlus, Next Day Support, 12 months", max_length=30, num_return_sequences=5)

Setting pad_token_id to eos_token_id:50256 for open-end generation.

print(sentence[1])

[{'generated_text': "ProSupportPlus, Next Day Support, 12 months of support, and an additional $40 per month per new client - plus we'll add new support"}]
```

FIG. 6

| Service Product SKU | Duration | Category | Service Level |
|---|---|---|---|
| ABC123 | 3 | Pro Support Plus | 4 Hours |
| ABC456 | 1 | Pro Support | Next Business Day |
| ABC178 | 1 | Basic | Depot |

FIG. 8

| Order Number | Customer | Location | Region | Main Product SKU | Attached Service Product SKU | Duration | Category | Service Level |
|---|---|---|---|---|---|---|---|---|
| 20210218 | Acme Inc. | San Antonio, Texas | AMER | XYZ456 | ABC123 | 3 | Pro Support Plus | 4 Hours |
| 20210219 | ABC Inc. | Seattle, Washington | AMER | XYZ123 | ABC456 | 1 | Pro Support | Next Business Day |
| 20210220 | XYZ Inc. | Tokyo, Japan | APJ | XYZ789 | ABC789 | 1 | Basic | Depot |

```
import numpy as np
import pandas as pd
import warnings
warnings.filterwarnings('ignore')
matplotlib inline
import random
import matplotlib.pyplot as plt
import seaborn as sns
from sklearn.ensemble import IsolationForest
```

```
config_df = pd.read_csv('order_product_config_data.csv')
config_df.head(10)
```

|   | order | customer | productSKU | serviceSKU | category | serviceLevel |
|---|---|---|---|---|---|---|
| 0 | 20210218 | ABC Inc | XYZ123 | ABC456 | PROSUPPORT | 4HR |
| 1 | 20210230 | Acme Inc | XYZ123 | ABC456 | PROSUPPORT | 4HR |
| 2 | 20210310 | Bugs Bunny LLC | XYZ456 | ABC123 | BASIC | DEPOT |
| 3 | 20210410 | ABC Inc | XYZ456 | ABC123 | PROSUPPORT | 4HR |
| 4 | 20210240 | Acme Inc | XYZ456 | ABC456 | BASIC | NBD |
| 5 | 20210125 | Wiley Coyote Inc | XYZ123 | ABC123 | BASIC | DEPOT |
| 6 | 20210135 | Bugs Bunny LLC | XYZ123 | ABC123 | PROSUPPORT | 4HR |
| 7 | 20210182 | Acme Inc | XYZ123 | ABC123 | BASIC | DEPOT |
| 8 | 20210219 | ABC Inc | XYZ456 | ABC178 | PROSUPPORT | NBD |

```
from sklearn.preprocessing import LabelEncoder creating instance of labelencoder
labelencoder = LabelEncoder()

config_df['customer'] = labelencoder.fit_transform(config_df['customer'])
config_df['productSKU'] = labelencoder.fit_transform(config_df['productSKU'])
config_df['serviceSKU'] = labelencoder.fit_transform(config_df['serviceSKU'])
config_df['category'] = labelencoder.fit_transform(config_df['category'])
config_df['serviceLevel'] = labelencoder.fit_transform(config_df['serviceLevel'])
config_df.head()
```

| order | customer | productSKU | serviceSKU | category | serviceLevel |
|---|---|---|---|---|---|
| 0 20210218 | 1 | 0 | 2 | 1 | 0 |
| 1 20210230 | 0 | 0 | 2 | 0 | 0 |
| 2 20210310 | 4 | 1 | 0 | 0 | 1 |
| 3 20210410 | 1 | 1 | 0 | 1 | 0 |
| 4 20210240 | 0 | 1 | 2 | 0 | 2 |

```
random_state = np.random.RandomState(42)

model=IsolationForest(n_estimators=100,max_samples='auto',contamination=float(0.2),random_state=random_state)

model.fit(config_df[['productsku', 'servicesku', 'category', 'servicelevel']])
print(model.get_params())

{'bootstrap': False, 'contamination': 0.2, 'max_features': 1.0, 'max_samples': 'auto', 'n_estimators': 100, 'n_jobs': None,
'random_state': RandomState(MT19937) at 0x27136FDEB8, 'verbose': 0, 'warm_start': False}
```

FIG. 14

```
config_df['scores'] = model.decision_function(config_df[['productSKU', 'serviceSKU', 'category', 'serviceLevel']])
config_df['anomaly_score'] = model.predict(config_df[['productSKU', 'serviceSKU', 'category', 'serviceLevel']])
config_df[config_df['anomaly_score']==-1].head(10)
anomaly_count = len(config_df[config_df['anomaly_score'] == -1])
anomaly_count

| | order | customer | productSKU | serviceSKU | category | serviceLevel | scores | anomaly_score |
|---|---|---|---|---|---|---|---|---|
| 4 | 20210240 | 0 | 1 | 1 | 2 | 0 | -0.049872 | -1 |
| 8 | 20210219 | 1 | 1 | 1 | 1 | 2 | -0.028922 | -1 |

```
accuracy = 100*list(config_df['anomaly_score']).count(-1)/(anomaly_count)
print("Accuracy of the model:", accuracy)

Accuracy of the model: 100.0 prediction = model.predict([[1, 0, 0, 1]])

if (prediction == 1):
    print("Normal Selection")
else:
    print("Anomalous Selection")

Normal Selection prediction = model.predict([[1, 2, 0, 2]])

if (prediction == 1):
    print("Normal Selection")
else:
    print("Anomalous Selection")

Anomalous Selection
```

PRODUCT CONFIGURATION ANALYSIS AND ANOMALY PREDICTION USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to product configuration in information processing systems.

BACKGROUND

Enterprises offer various types of support with their products including, for example, warranties, technical support services and product installation, deployment and repair services. Large enterprises may have numerous support options, which can be combined in multiple ways with, for example, hardware and software products.

Errors in product configuration and corresponding support offer data are common, and may result in incorrect order fulfillment and a lack of appropriate product support. Under conventional approaches, there are no systems in place to determine product and support offering issues in advance of their occurrence and to adequately handle such problems when they occur.

SUMMARY

Embodiments provide a product configuration validation platform in an information processing system.

For example, in one embodiment, a method comprises receiving product selection data, wherein the product selection data characterizes at least one combination of at least two products. In the method, the product selection data is analyzed using one or more machine learning algorithms. The method further comprises predicting based, at least in part, on the analyzing, whether the at least one combination is anomalous. One or more alerts are generated in response to predicting that the at least one combination is anomalous.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 2A depicts sample product description data and corresponding features with an indication of whether the combination is anomalous.

FIG. 2B depicts sample order data including a main product and a corresponding service product with an indication of whether the combination is anomalous.

FIG. 4 depicts example pseudocode for leveraging Key2Text transformers to generate sentences from a set of input words in an illustrative embodiment.

FIG. 5 depicts example pseudocode for passing words for product attributes as a list of text to a model for sentence generation in an illustrative embodiment.

FIG. 6 depicts example pseudocode for generating a pre-trained GPT2 transformer model from a transformer pipeline and passing attribute values in concatenated text to generate sentences in an illustrative embodiment.

FIG. 8 depicts example training data including service products and their features in an illustrative embodiment.

FIG. 9 depicts example training data including main products and their corresponding service products in an illustrative embodiment.

FIG. 11 depicts example pseudocode for importation of libraries in an illustrative embodiment.

FIG. 12A depicts example pseudocode for loading historical orders data and product configuration data into a data frame in an illustrative embodiment.

FIG. 12B depicts example training data in an illustrative embodiment.

FIG. 13A depicts example pseudocode for encoding training data in an illustrative embodiment.

FIG. 13B depicts encoded training data in an illustrative embodiment.

FIG. 14 depicts example pseudocode for training an isolation forest model in an illustrative embodiment.

FIG. 15A depicts example pseudocode for computing anomaly scores using a model predict function in an illustrative embodiment.

FIG. 15B depicts example training data with anomaly scores in an illustrative embodiment.

FIG. 16 depicts example pseudocode for computing an accuracy score of the machine learning model and generating predictions for two types of product selections matching with their respective metrics in an illustrative embodiment.

DETAILED DESCRIPTION

Figure 1:
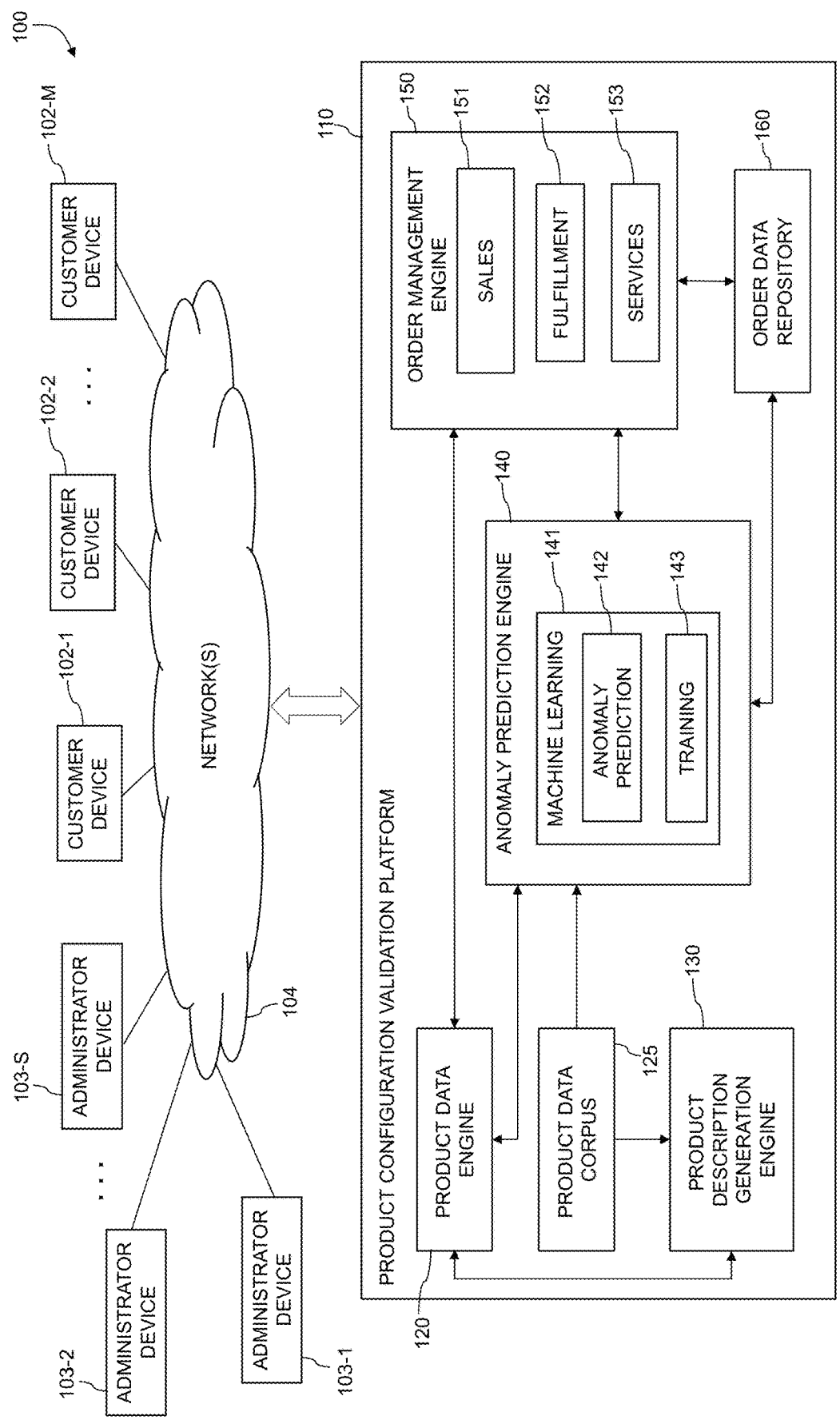
FIG. 1 depicts an information processing system with a product configuration validation platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in artificial intelligence where natural language input is disassembled and parsed to determine appropriate syntactic and semantic schemes in order to comprehend and use languages. NLU may rely on computational models that draw from linguistics to understand how language works, and comprehend what is being said by a user.

As used herein, "natural language generation (NLG)" is to be broadly construed to refer to a computer process that transforms data into natural language. For example, NLG systems decide how to put concepts into words. NLG can be accomplished by training machine learning models using a corpus of human-written texts.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises customer devices 102-1, 102-2, . . . 102-M (collectively "customer devices 102") and administrator devices 103-1, 103-2, . . . 103-S (collectively "administrator devices 103"). The customer devices 102 and administrator devices 103 communicate over a network 104 with a product configuration validation platform 110. The variable M and other similar index variables herein such as K, L and S are assumed to be arbitrary positive integers greater than or equal to one.

The customer devices 102 and administrator devices 103 can comprise, for example, Internet of Things (IoT) devices, desktop, laptop or tablet computers, mobile telephones, or other types of processing devices capable of communicating with the product configuration validation platform 110 over the network 104. Such devices are examples of what are more generally referred to herein as "processing devices." Some of these processing devices are also generally referred to herein as "computers." The customer devices 102 and administrator devices 103 may also or alternately comprise virtualized computing resources, such as virtual machines (VMs), containers, etc. The customer devices 102 and/or administrator devices 103 in some embodiments comprise respective computers associated with a particular company, organization or other enterprise.

The terms "customer," "administrator" or "user" herein are intended to be broadly construed so as to encompass numerous arrangements of human, hardware, software or firmware entities, as well as combinations of such entities. Product configuration validation services may be provided for users utilizing one or more machine learning models, although it is to be appreciated that other types of infrastructure arrangements could be used. At least a portion of the available services and functionalities provided by the product configuration validation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the product configuration validation platform 110, as well as to support communication between the product configuration validation platform 110 and connected devices (e.g., customer devices 102 and administrator devices 103) and/or other related systems and devices not explicitly shown.

In some embodiments, the administrator devices 103 are assumed to be associated with repair technicians, system administrators, information technology (IT) managers, software developers, release management personnel or other authorized personnel configured to access and utilize the product configuration validation platform 110.

The customer devices 102 are respectively associated with one or more customers placing orders for products. As explained in more detail herein, along with a given product (e.g., personal computer, laptop, storage array, etc.), an enterprise may offer support products such as, but not necessarily limited to, warranties and installation, deployment and repair services for the given product. Enterprises may sell these support products in conjunction with a main product (e.g., hardware, appliances, software, etc.).

Large enterprises may, for example, have a catalog of thousands to millions of support offers, which may be combined in numerous ways with other products. With conventional approaches, errors in accumulating product data and data entry for product data can result in differences between what is intended to be sold and what is actually sold to customers. For example, product data may include a significant number of attributes associated with a service product that define the kind of services to be provided to a customer. The attributes may specify, for example, the duration of a service plan, a payment schedule, included parts, materials and/or labor, when service is to be provided (e.g., next business day, within a designated time, etc.), and availability of support (e.g., 24 hours per day, 7 days per week, weekdays, weekends, etc.). With current approaches, the description of a product may not be consistent with the product's configuration and/or attributes. Additionally, with conventional techniques, inconsistent product descriptions may lead to product combinations which are not appropriate. For example, if a particular higher-end product is typically sold with a same business day or better support plan, an order in which the higher-end product is paired with a lower-end support plan may be incorrect.

Current systems lack adequate approaches to find issues with product descriptions and product combinations. The systems are reactive in nature, seeking out issues in response to customer complaints. Moreover, current computing systems are not equipped and do not have adequate computational resources to handle the textual and contextual analysis required to identify such problems, link the problems to a large number (e.g., thousands to millions) of orders, and ultimately correct the issues.

The embodiments advantageously provide techniques to use machine learning to analyze new product and sales (e.g., order) data based on historical product and sales data known to be valid. As a result, the embodiments provide techniques to proactively flag anomalous product data instances and anomalous product combinations prior to impacting customers. As an additional advantage, the embodiments leverage NLP, NLU, NLG and other machine learning algorithms to generate product descriptions from inputted product attributes to improve product description accuracy and eliminate errors stemming from incorrect descriptions.

The product configuration validation platform 110 in the present embodiment is assumed to be accessible to the customer devices 102 and/or administrator devices 103 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the product configuration validation platform 110 includes a product data engine 120, a product data corpus 125, a product description generation engine 130, an anomaly prediction engine 140, an order management engine 150 and an order data repository 160. The anomaly prediction engine 140 includes a machine learning layer 141 comprising anomaly prediction and training layers 142 and 143. The order management engine 150 includes a sales layer 151, a fulfillment layer 152 and a services layer 153.

The product data engine 120 comprises one or more databases including product data for products of an enterprise. Such product data may comprise, but is not necessarily limited to, product stock keeping unit (SKU) identifiers (e.g., numbers), product descriptions and attributes corresponding to respective products. In a non-limiting operational example, referring to the table 201 in FIG. 2A, product data in the product data engine 120 can include a description of a service product that indicates, for example, "1 Year, ProSupport Plus 4 Hour," corresponding to a "ProSupport Plus" service plan having a 1 year duration, and promising service within 4 hours of reporting a problem (SKU 123-1111). Additional example product data in the product data engine 120 may include a description of a service product that states "1 Year, Depot Repair," corresponding to a "Basic" service plan having a 1 year duration, and providing service from a service provider at a particular service location ("depot") (SKU 123-3333). Further product data in table 201 includes SKUs 456-4444 and 456-5555 for a "Basic Laptop" and a "High-end Storage Array," respectively.

As can be seen in table 201, if applicable, the product attributes (e.g., duration, category and service level) for SKUs 123-1111, 123-3333, 456-4444 and 456-5555 are consistent with the product descriptions and are not anomalous. Referring to SKU 123-2222 in table 201, product data in the product data engine 120 includes a description of a service product that indicates, for example, "2 Years, ProSupport Plus 4 Hour." However, unlike the other SKUs in table 201, the product description for SKU 123-2222 is not consistent with the corresponding attributes of a "ProSupport" service plan having a 1 year duration, and promising service within the next business day of reporting a problem, and has been labelled as anomalous. As can be understood from table 201, some of the product data in the product data engine 120 may include descriptions of products that are not consistent with the products' configurations and/or attributes. For example, in the case of SKU 123-2222, the product description does not align with any of the 3 attributes (duration, category or service level). As a result, under conventional approaches, a seller or customer may think they are selling or purchasing 2 years of ProSupport Plus, 4-hour protection, but instead 1 year of ProSupport, next business day protection will be fulfilled programmatically. As explained, in more detail herein, the product data from the product data engine 120 is provided to the anomaly prediction engine 140 to identify anomalous instances of product data (e.g., like SKU 123-2222) so that the anomalies can be corrected before an order is fulfilled. As noted herein below, based on historical product description and attributes data from a product data corpus 125, the machine learning layer 141 of the anomaly prediction engine 140 is trained to identify normal and anomalous product descriptions. For example, referring to the table 201, the anomaly prediction layer 142 identifies that the product descriptions for SKUs 123-1111, 123-3333, 456-4444 and 456-5555 are normal, and not anomalous. In contrast, the anomaly prediction layer 142 identifies that the product description for SKU 123-2222 is anomalous and flags it for review.

The product data from the product data engine 120 is provided to the order management engine 150 and is used by the sales layer 151 in connection with recommending and selling product combinations to customers. For example, as noted herein above, along with a given product, an enterprise may offer support products, and sell these support products in conjunction with a main product. However, if the product data from the product data engine 120 includes product descriptions that are inconsistent with the product attributes, this may lead to product combinations which are not appropriate. For example, as noted above, if a particular higher-end product is typically sold with a same business day or better support plan, an order in which the higher-end product is paired with a lower-end support plan may be incorrect. In more detail, referring to the table 202 in FIG. 2B, for order number 3, a high-end storage array (SKU 456-5555) is coupled with a lower-end support plan (e.g., 1 Year, Depot Repair (SKU 123-3333)). This combination, which is labeled as anomalous in table 202, may be due to, for example, an inconsistent product description for SKU 123-3333. As explained, in more detail herein, order data from the order management engine 150 is provided to the anomaly prediction engine 140 to identify anomalous order instances where identified product combinations deviate from the norm, so that the anomalies can be corrected before an order is fulfilled by the fulfillment layer 152 and services are provided by the services layer 153. As noted herein below, based on historical orders data (also referred to herein as "historical product selection data") from an order data repository 160, the machine learning layer 141 of the anomaly prediction engine 140 is trained to identify normal and anomalous combinations. For example, referring to the table 202, the anomaly prediction layer 142 identifies that it is normal for the basic laptop (SKU 456-4444) to be sold with the 1 year depot repair service product (SKU 123-3333). Therefore, the configuration for order number 2 is not anomalous. In contrast, the anomaly prediction layer 142 identifies that the identified combination of the high-end storage array (SKU 456-5555) and the 1 year depot repair service product (SKU 123-3333) is anomalous. As a result, a sales order from the order management engine 150, where depot repair (e.g., SKU 123-3333) is sold as a support product together with a high-end storage array (e.g., SKU 456-5555) as in the case with example order number 3 in table 202, would be identified by the anomaly prediction layer 142 as anomalous and flagged for review before order fulfillment.

Figure 3A:
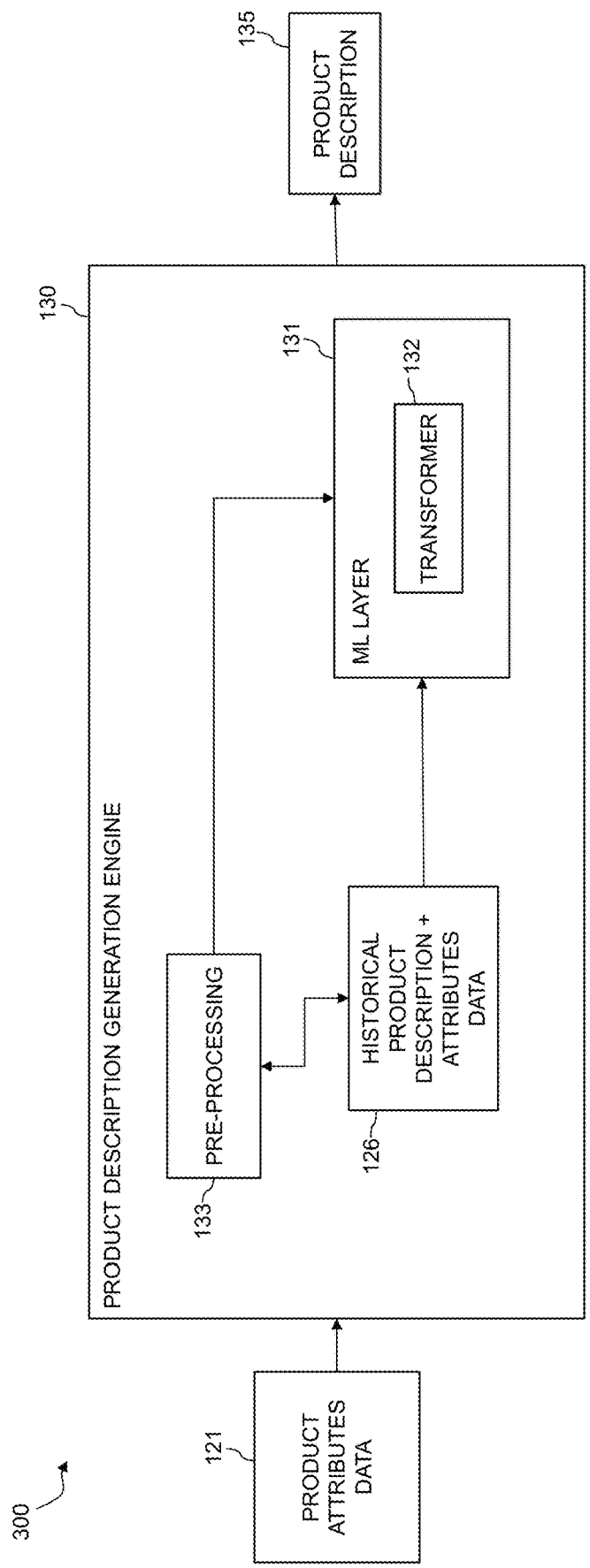
FIG. 3A depicts an operational flow for product description generation in an illustrative embodiment.

Referring to the product description generation engine 130 in FIG. 1, in addition to detecting anomalies, the embodiments also provide techniques for NLG of product descriptions from product attributes received from the product data engine 120. For example, referring to FIG. 3A, when a product is created in the product data engine 120, a request to the product description generation engine 130 is invoked to generate a product description 135 from product attributes data 121 for the created product. The product description generation engine 130 includes a machine learning (ML) layer 131, which leverages NLG and is trained with historical product description and attributes data 126 from an enterprise product data corpus 125 to accurately generate textual descriptions that are appropriate for the products of the enterprise. Accuracy of a product description 135 advantageously reduces misconfigurations (e.g., anomalous combinations) of products in both on-line and off-line sales systems by customers and sales agents. In FIG. 3A, the product description generation engine 130 illustrates a pre-processing component 133, which processes the incoming product attributes data 121 and the historical product description and attributes data 126 for analysis by the ML layer 131. For example, the pre-processing component 133 removes any unwanted characters, punctuation, and stop words.

The product description generation engine 130 generates a product description 135 from corresponding product attributes data 121 using highly sophisticated neural networks and NLG techniques. Illustrative embodiments leverage one or more transformers. As used herein, a "transformer" is to be broadly construed to refer to a deep learning model that differentially weighs the significance of portions of input data. Similar to recurrent neural networks (RNNs), transformers manage sequential input data. However, transformers do not necessarily process the data in order, and utilize mechanisms which provide context for any position in an input sequence. By identifying context, a transformer does not need to process the beginning of a data sequence before the end of the data sequence, which allows for more parallelization than RNNs to reduce training time. Non-limiting examples of transformer-based neural network machine learning models that may be used by the embodiments are a Bidirectional Encoder Representations from Transformers (BERT) model, a GPT model and a GPT2/3 model, which may use context from both directions, and use encoder parts of transformers to learn a representation for each token.

In some embodiments, a pre-trained transformer 132 trained with large amounts of general-purpose text is then trained with custom enterprise corpus data (e.g., historical product description and attributes data 126 from product data corpus 125) for accurate sentence generation. The transformer 132 solves sequence to sequence issues while handling long-range issues. Since the attribute descriptions in natural language are essentially a sequence of words in the body of text, and the output sentence is also a sequence of words, this can be modeled as a many-to-many sequence-to-sequence problem which the transformer 132 solves.

A many-to-many sequence-to-sequence configuration has two core building blocks (encoder and decoder) and one supporting capability called an "attention mechanism." The encoder-decoder architecture solves sequence-to-sequence problems like text generation or sentence generation tasks where input and output sequences are of different lengths. Considering an input textual message is similar to a time series model where the words come one after another in time and/or space, the transformer 132 comprises a sophisticated encoder-decoder with a multi-head attention mechanism.

Figure 3B:
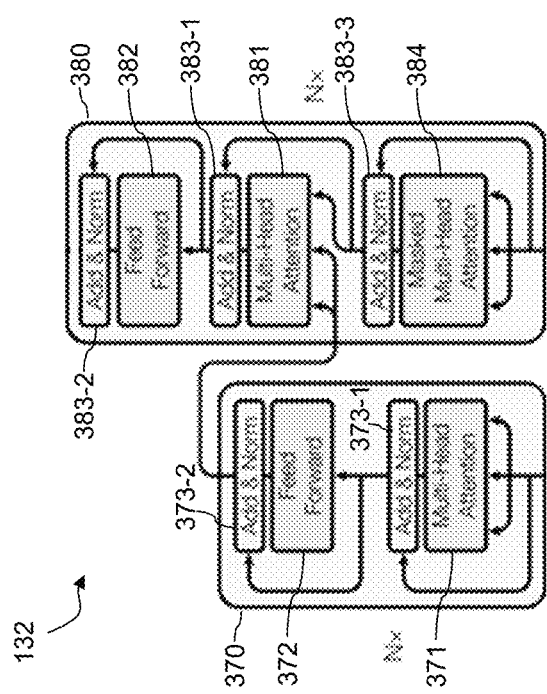
FIG. 3B depicts an architecture of a transformer in an illustrative embodiment.

The architecture of a transformer 132 in an illustrative embodiment is shown in FIG. 3B. Referring to FIG. 3B, the encoder 370 is composed of a stack of a N=6 identical layers. Each layer has two sub-layers. The first sub-layer includes a multi-head self-attention mechanism 371, and the second sub-layer includes a fully connected feed-forward network 372. A residual connection is employed around each of the two sub-layers, followed by layer normalization 373-1, 373-2. The output of each encoder sub-layer is LayerNorm(x+Sublayer(x)), where Sublayer(x) is the function implemented by the sub-layer. The decoder 380 is also composed of a stack of N=6 identical layers. Like each encoder layer, a layer of the decoder 380 includes two sub-layers including a multi-head self-attention mechanism 381, and a fully connected feed-forward network 382. Each layer of the decoder 380 further includes a third sub-layer comprising a masked multi-head self-attention mechanism 384. The third sub-layer performs multi-head attention over the output of the encoder stack. Similar to the encoder, residual connections around each of the sub-layers are employed, followed by layer normalization 383-1, 383-2 and 383-2. The masked multi-head self-attention mechanism 384 prevents positions from attending to subsequent positions. This masking, combined with the fact that output embeddings are offset by one position, ensures that predictions for position i can depend only on known outputs at positions less than i. See Ashish Vaswani et al., *Attention Is All You Need*, $31^{st}$ Conference on Neural Information Processing Systems (NIPS 2017) (ArXiv Paper No. 1706.03762), which is incorporated by reference herein.

Illustrative embodiments utilize a Key2Text (K2T) or an OpenAI™ GPT2 transformer pre-trained with large amounts (e.g., millions of instances) of textual corpus data using, for example, PyTorch® and/or Tensorflow® software. The textual corpus data used for pre-training comprises, for example, community data from sources such as, but not necessarily limited to, Wikipedia®, news sources, social media (e.g., Twitter®) feeds, etc. Considering the data to be analyzed by the product description generation engine 130 will involve a massive amount of enterprise specific product data, the transformer models are customized and re-trained with domain-specific data from the product data corpus 125.

Illustrative embodiments utilize a Key2Text Python® package that leverages pre-trained K2T-base transformers to generate word combinations (e.g., sentences, phrases, etc.) from a set of input words. The package is built on top of a T5 transformer model and simplifies the APIs to use the model. FIG. 4 depicts example pseudocode 400 for leveraging Key2Text transformers to generate word combinations from a set of input words in an illustrative embodiment.

FIG. 5 depicts example pseudocode 500 for passing words for product attributes as a list of text to a model for sentence generation. In illustrative embodiments, a model is created from a pipeline. For example, a K2T-base that is based on a T5-base transformer and pre-trained with general purpose language data is indicated. Hyperparameters like the number of beams (e.g., the number of steps for each search path or probable words/text) and the no repeat n-gram size (e.g., the size of an n-gram that cannot occur more than once) are specified. As shown in FIG. 5, words for product attributes are passed as a list of text to the model for sentence generation.

Another approach in illustrative embodiments is to leverage an advanced OpenAI™ GPT2 transformer, which is trained using a massive amount of general-purpose text and capable of generating multiple word combinations from the same input words. A pre-trained GPT2 model is created from a transformer pipeline and the attribute values are passed in concatenated text to generate word combinations. FIG. 6 depicts example pseudocode 600 for generating a pre-trained GPT2 transformer model from a transformer pipeline and passing attribute values in concatenated text to generate word combinations.

In illustrative embodiments, a pre-trained transformer is augmented with training data from corpus data that includes enterprise specific domain data (e.g., historical product description and attributes data 126 from product data corpus 125). This can be achieved by leveraging pre-processing component 133 to load and pre-process (e.g., remove stop words, emojis, etc., perform stemming, lemmatization, etc.) custom training datasets to prepare for tokenization. Tokenizing converts words to numbers, which facilitates building of word vectors for NLP tasks. Tokenization can be done using a HuggingFace function "DistilBertTokenizerFast( )" Once the model is augmented with a domain specific corpus, generated product descriptions will be highly accurate and standardized, eliminating manual entry by humans and resolving the aforementioned problem of discrepancies between product descriptions and product attributes.

When products (e.g., main products and associated service products) are selected during an ordering process by customers via, for example, customer devices 102, the sales layer 151 of the order management engine 150 will invoke a request to the anomaly prediction engine 140 to detect any mismatch in the product selection (e.g., problematic combination of an identified main product with an identified service product). Upon detection of an anomalous combination, the sales layer 151 is notified by the anomaly prediction engine 140 of the anomaly and proactively generates one or more alerts, which may be transmitted to one or more administrators, via, for example, administrator devices 103, to correct the products in the order prior to order fulfillment by the fulfillment layer 152 and/or prior to the provision of services by the services layer 153. Generating an alert may comprise activating a flag requesting review of the order prior to order fulfillment. To detect anomalous product combinations, the training layer 143 of the machine learning layer 141 of the anomaly prediction engine 140 is trained with historical orders data from the order data repository 160 to learn which product combinations are typically used (e.g., considered normal). It is to be understood that although the embodiments are discussed in terms of main products (e.g., hardware, appliances, software, etc.) and associated service products, the embodiments are not limited thereto, and may apply to other types of products and combinations depending on the nature of the enterprise. Additionally, the embodiments are not necessarily limited to combinations where two products have been identified, and may be applied to detect anomalies in combinations where more than two products have been identified.

As noted above, in another aspect, based on input data from the product data engine 120, the anomaly prediction engine 140 identifies as anomalous instances where a product description is not consistent with the corresponding attributes of the product. As noted herein, some of the product data in the product data engine 120 may include descriptions of products that are not consistent with the products' configurations and/or attributes. For example, the addition of new product attributes and description data to the product data engine 120 will invoke a request to the anomaly prediction engine 140 to detect any product descriptions that do not reflect corresponding product attributes. Upon detection of an anomalous combination, the product data engine 120 is notified by the anomaly prediction engine 140 of the anomaly and proactively generates one or more alerts, which may be transmitted to one or more administrators, via, for example, administrator devices 103, to correct the product description. Generating an alert may comprise activating a flag requesting review of the product description. For example, this feature can be used to alert personnel in real-time of inconsistencies with the product attributes responsive to generating (e.g., authoring) product data (e.g., at the time of generating new product descriptions). To detect anomalous product descriptions, the training layer 143 of the machine learning layer 141 of the anomaly prediction engine 140 is trained with historical product description and attributes data from the product data corpus 125 to learn which product description and attribute combinations are typically used (e.g., considered normal).

Figure 7:
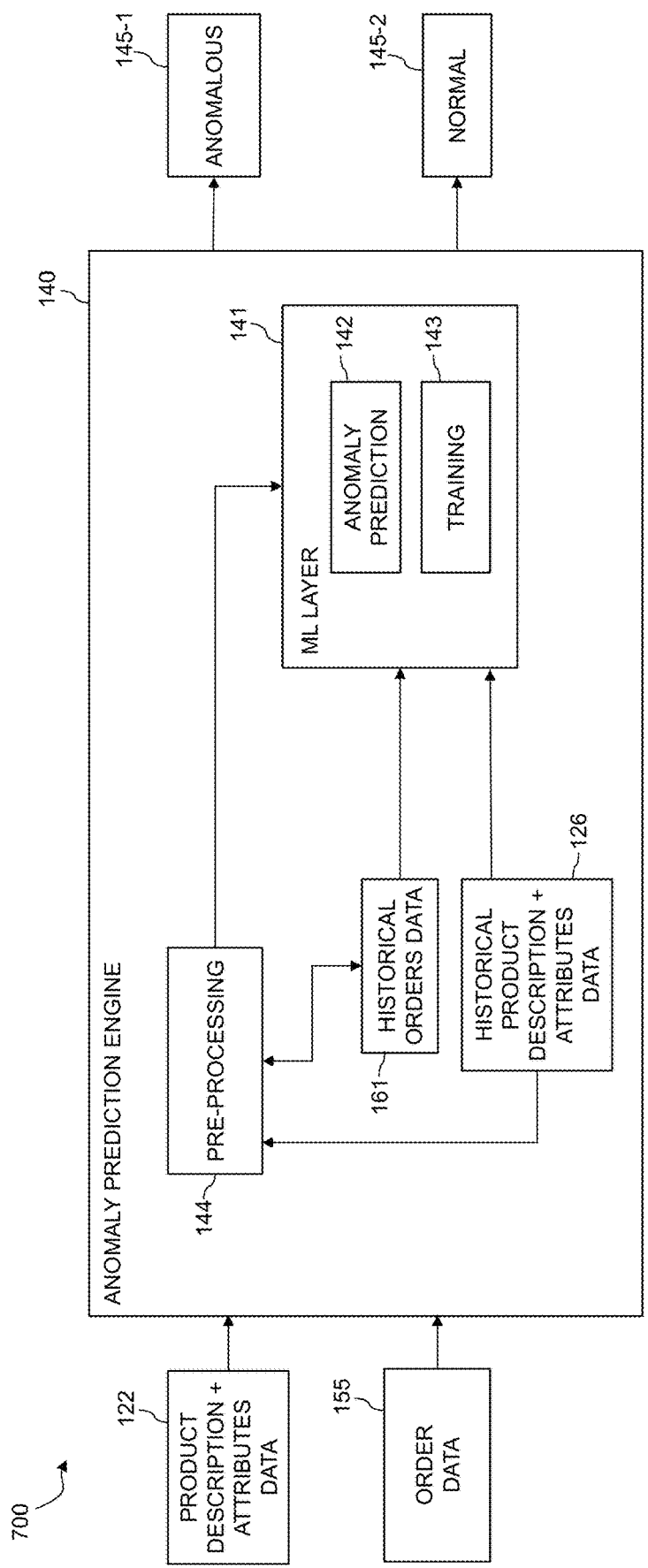
FIG. 7 depicts an operational flow for anomaly prediction in an illustrative embodiment.

Referring to the operational flow 700 in FIG. 7, a more detailed explanation of an embodiment of an anomaly prediction engine 140 is described. For example, data to be analyzed for anomalies is input to the anomaly prediction engine 140. In more detail, product description and attributes data 122 from the product data engine 120 and/or order data 155 for products (e.g., main products and associated service products) selected during an ordering process from the order management engine is input to the anomaly prediction engine 140. In illustrative embodiments, the order data 155, also referred to herein as product selection data, comprises at least one combination of identifiers of at least two products. For example, order data 155 for respective orders may include an identifier for a main product (e.g., product name, SKU, product description or other identifier) and an identifier for an associated service product (e.g., product name, SKU, product description or other identifier). As can be understood, the product selection data characterizes at least one combination of at least two products.

As noted herein above, depending on the nature of the anomaly (e.g., inconsistent product description or problematic product combination), the training layer 143 of the machine learning (ML) layer 141 is trained with historical product description and attributes data 126 and historical orders data 161. The anomaly prediction engine 140 includes a pre-processing component 144, which processes the incoming product description and attributes data 122 and/or order data 155, and the historical product description and attributes data 126 and historical orders data 161 for analysis by the ML layer 141. For example, the pre-processing component 144 removes any unwanted characters, punctuation, and stop words. As can be seen in FIG. 7, the anomaly prediction engine 140 analyzes the incoming product description and attributes data 122 and/or order data 155 using the ML layer 141 comprising anomaly prediction and training layers 142 and 143. Based on the analysis, the anomaly prediction layer 142 determines, based on the product description and attributes data 122, whether a product description is anomalous 145-1 or normal 145-2, or based on the order data 155, whether an identified product combination is anomalous 145-1 or normal 145-2. As explained further herein below, the same type of machine learning model can be used to predict anomalous descriptions and combinations, while varying the input and training data respectively used in connection with predicting anomalous descriptions and anomalous combinations.

The anomaly prediction engine 140 uses an unsupervised learning approach to detect anomalies in product selections (e.g., identified product combinations) and product descriptions. Normal product descriptions with respect to particular attributes are learned from historical product description and attributes data 126, and product selections of normal product combinations are learned the historical orders data 161. For example, the table 800 in FIG. 8 depicts example training data including service products and their features, and the table 900 in FIG. 9 depicts example training data including main products and their corresponding service products. As can be seen in FIG. 8, the service product attributes for different service product SKUs include, for example, service plan duration, service plan category and service level specifying service during a particular time frame or at a particular location. As can be seen in FIG. 9, for particular order numbers (which may be, for example, based on dates), a customer, location, region, main product SKU, and attached service product SKU are specified. Additionally, in the table 900, similar to the table 800 in FIG. 8, the service product attributes for the attached service product SKUs, including, for example, service plan duration, service plan category and service level, are indicated. The training data shown in FIGS. 8 and 9 are examples, and may include more or less metrics than what is shown.

Anomaly detection or outlier detection identifies situations that are not considered normal based on the observation of the properties being considered. For example, according to illustrative embodiments, in normal orders, each transaction will have a specific main product and an attached service product and its attributes. During product mismatch situations, these features vary from the normal orders, and are considered as outliers or anomalies.

The machine learning layer 141 leverages unsupervised learning methodology for outlier detection of product descriptions and product combinations at the time of ordering and product data creation. The unsupervised learning methodology may utilize, for example, shallow or deep learning. In an embodiment, the machine learning layer 141 implements multivariate anomaly detection using an isolation forest algorithm, which does not require labeled training data. The isolation forest algorithm identifies anomalies among the normal observations, by setting up a threshold value in a contamination parameter that can apply for real-time predictions. The isolation forest algorithm has the capacity to scale up to handle extremely large data sizes (e.g., terabytes) and high-dimensional problems with a large number of attributes, some of which may be irrelevant and potential noise. The isolation forest algorithm has relatively low linear time complexity and prevents masking and swamping effects in anomaly detection. A masking effect is where a model predicts normal behavior when the behavior is anomalous. A swamping effect is where a model predicts anomalous behavior when the behavior is normal.

Figure 10:
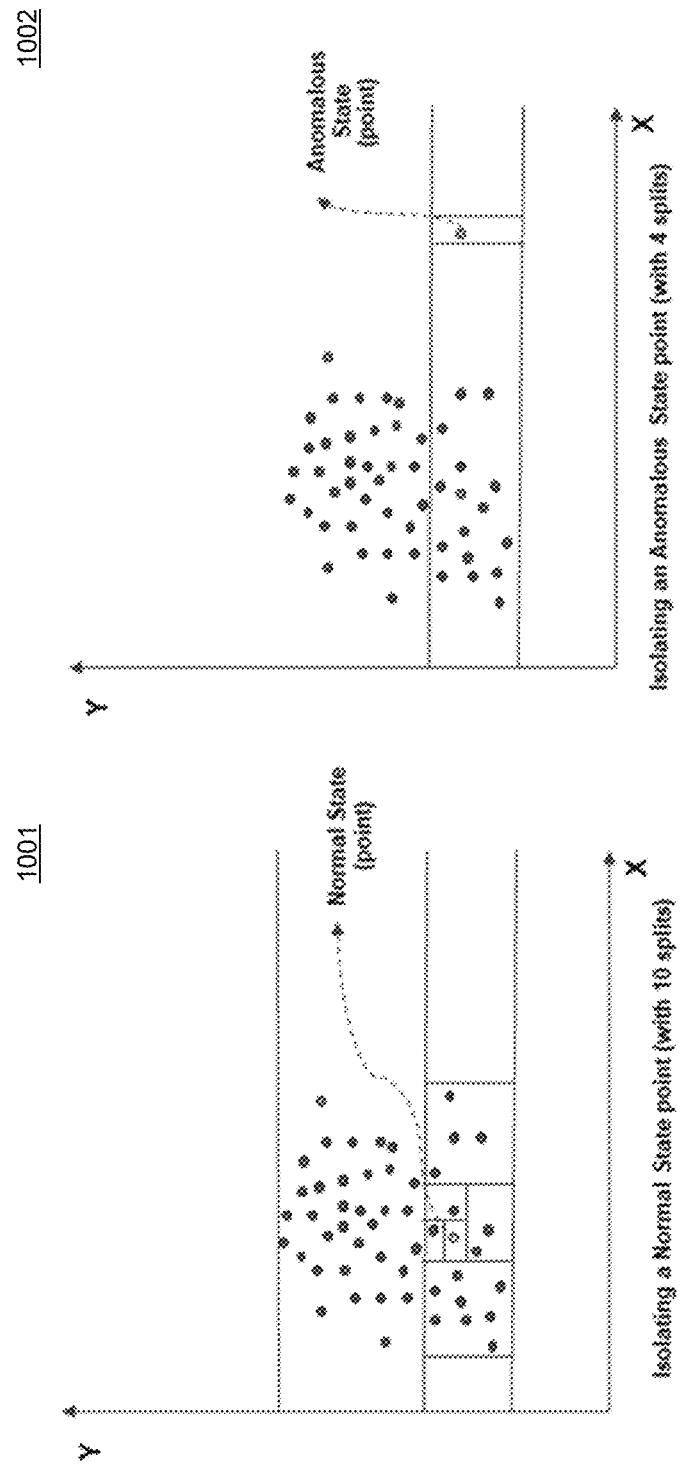
FIG. 10A depicts a plot illustrating isolation of a normal state point in an illustrative embodiment.
FIG. 10B depicts a plot illustrating isolation of an anomalous state point in an illustrative embodiment.

In illustrative embodiments, the machine learning model used by the machine learning layer 141 isolates an anomaly by creating decision trees over random attributes. This random partitioning produces significantly shorter paths since fewer instances of anomalies result in smaller partitions, and distinguishable attribute values are more likely to be separated in early partitioning. As a result, when a group (e.g., forest) of random trees collectively produces shorter path lengths for some particular points, then they are highly likely to be anomalies. A larger number of splits are required to isolate a normal point, while an anomaly can be isolated by a shorter number of splits. For example, referring to the plots 1001 and 1002 in FIGS. 10A and 10B, a normal state point is isolated with 10 splits and an anomalous state point is isolated with four splits. The splits are shown as horizontal and vertical lines in the plot of points. The number of splits determine the level at which the isolation occurred and is used by the anomaly prediction layer 142 to generate an anomaly score. The process is repeated multiple number of times and the isolation level of each point is noted. Once an iteration is completed, the anomaly score of each point/instance suggests the likeliness of an anomaly. The score is a function of the average level at which the point is isolated. The top points/instances having an anomaly score exceeding a threshold are labeled as anomalies by the anomaly prediction layer 142. Alternatively, the machine learning layer 141 uses supervised learning models such as, for example, support vector machines (SVMs) or neural networks.

According to one or more embodiments, when products are selected via the sales layer 151 of an order management engine 150 (e.g., both on-line and offline), selected products and their attributes, as well as customer and region, etc. are input to the trained model of the machine learning layer 141 for prediction. If the model detects that the selected products vary from the typical selections in the orders from the historical orders data 161, that product selection will be flagged as an anomaly or outlier. This is an indication that the product selection is unusual. According to one or more embodiments, in a normal condition, the flag is set to NORMAL and orders are fulfilled. The flag may be set to ANOMALOUS when the machine learning model of the anomaly prediction engine 140 determines that product selections are anomalous. When the flag is set to ANOMALOUS, the order is prevented from being fulfilled and an administrator is notified via, for example, one of the administrator devices 103.

In connection with the operation of the anomaly prediction engine 140, FIG. 11 depicts example pseudocode 1100 for importation of libraries used to implement the anomaly prediction engine 140. For example, Python, ScikitLearn, Pandas and Numpy libraries can be used. FIG. 12A depicts example pseudocode 1201 for loading historical orders data into a Pandas data frame for building training data. Similar to FIG. 9, FIG. 12B depicts a table 1202 of example training data in an illustrative embodiment. As can be seen in the table 1202, the training data identifies particular order numbers (which may be, for example, based on dates), a customer, main product SKU, and attached service product SKU. Additionally, in the table 1202, the service product attributes for the attached service product SKUs, including, for example, service plan category and service level, are indicated. The data shown in the table 1202 is a non-limiting example of the attributes of training data, and the embodiments are not necessarily limited to the depicted metrics.

FIG. 13A depicts example pseudocode 1301 for encoding training data in an illustrative embodiment. For example, since machine learning works with numbers, categorical and textual attributes like the customer name, SKUs, service plan category and service level must be encoded before being used as training data. In one or more embodiments, this can be achieved by leveraging a LabelEncoder function of ScikitLearn library as shown in the pseudocode 1301. FIG. 13B depicts a table 1302 of the encoded training data where categorical and textual attributes have been encoded as numbers that can be passed to a machine learning algorithm for computation.

In illustrative embodiments, the machine learning model (e.g., isolation forest model) is trained using historical data (e.g., historical product description and attributes data 126, and historical orders data 161). If the anomaly prediction layer 142 identifies a given product description or combination as deviating from typical product descriptions or combinations, and/or having anomaly scores exceeding a threshold, the anomaly prediction layer 142 identifies the given product description or combination as anomalous (e.g., anomalous 145-1). If the anomaly prediction layer 142 identifies a given product description or combination as being consistent with typical product descriptions or combinations, and/or having anomaly scores below a threshold, the anomaly prediction layer 142 identifies the given product description or combination as normal (e.g., normal 145-2).

FIG. 14 depicts example pseudocode 1400 for training an isolation forest model in an illustrative embodiment. For example, the isolation forest model is instantiated from ScikitLearn.ensemble package with some designated hyperparameters, such as, for example, a contamination parameter and a parameter for the number of estimators. Then the model is trained by passing the historical training data stored in the data frame. In the pseudocode 1400, the model is trained using four features including a main product SKU, an attached service product SKU, service product category and service level. More dimensions or features can be added in the data while training the model as needed.

FIG. 15A depicts example pseudocode 1501 for computing anomaly scores using a model predict function in an illustrative embodiment, and FIG. 15B depicts a table 1502 including example training data with anomaly scores in an illustrative embodiment. In one or more embodiments, the anomaly scores can be obtained from the model by using a model.predict( ) function in connection with the main product SKU, attached service product SKU, service product category and service level values. An anomaly score of −1 indicates a predicted anomaly and an anomaly score of 1 indicates a normal state prediction.

FIG. 16 depicts example pseudocode 1600 for computing an accuracy score of the machine learning model and for generating predictions for two types of product selections matching with their respective metrics in an illustrative embodiment. For example, the accuracy of the model is 100%. In connection with generating the predictions for the two types of product selections, the predictions are generated based on the four metrics noted above. If the anomaly score is 1, then the output is a normal selection, and if the anomaly score is −1, the output is an anomalous selection. The first product selection is predicted to be normal and the second product selection is predicted to be anomalous.

According to one or more embodiments, the product data corpus 125, order data repository 160 and other data corpuses, repositories or databases referred to herein can be configured according to a relational database management system (RDBMS) (e.g., PostgreSQL). In some embodiments, the product data corpus 125, order data repository 160 and other data corpuses, repositories or databases referred to herein are implemented using one or more storage systems or devices associated with the product configuration validation platform 110. In some embodiments, one or more of the storage systems utilized to implement the product data corpus 125, order data repository 160 and other data corpuses, repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the product configuration validation platform 110, the product data engine 120, product data corpus 125, product description generation engine 130, anomaly prediction engine 140, order management engine 150 and/or order data repository 160 in other embodiments can be implemented at least in part externally to the product configuration validation platform 110, for example, as stand-alone servers, sets of servers or other types of systems coupled to the network 104. For example, the product data engine 120, product data corpus 125, product description generation engine 130, anomaly prediction engine 140, order management engine 150 and/or order data repository 160 may be provided as cloud services accessible by the product configuration validation platform 110.

The product data engine 120, product data corpus 125, product description generation engine 130, anomaly prediction engine 140, order management engine 150 and/or order data repository 160 in the FIG. 1 embodiment are each assumed to be implemented using at least one processing device. Each such processing device generally comprises at least one processor and an associated memory, and implements one or more functional modules for controlling certain features of the product data engine 120, product data corpus 125, product description generation engine 130, anomaly prediction engine 140, order management engine 150 and/or order data repository 160.

At least portions of the product configuration validation platform 110 and the elements thereof may be implemented at least in part in the form of software that is stored in memory and executed by a processor. The product configuration validation platform 110 and the elements thereof comprise further hardware and software required for running the product configuration validation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the product data engine 120, product data corpus 125, product description generation engine 130, anomaly prediction engine 140, order management engine 150, order data repository 160 and other elements of the product configuration validation platform 110 in the present embodiment are shown as part of the product configuration validation platform 110, at least a portion of the product data engine 120, product data corpus 125, product description generation engine 130, anomaly prediction engine 140, order management engine 150, order data repository 160 and other elements of the product configuration validation platform 110 in other embodiments may be implemented on one or more other processing platforms that are accessible to the product configuration validation platform 110 over one or more networks. Such elements can each be implemented at least in part within another system element or at least in part utilizing one or more stand-alone elements coupled to the network 104.

It is assumed that the product configuration validation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the product data engine 120, product data corpus 125, product description generation engine 130, anomaly prediction engine 140, order management engine 150, order data repository 160 and other elements of the product configuration validation platform 110, and the elements thereof can each be implemented in the form of one or more LXCs running on one or more VMs. Other arrangements of one or more processing devices of a processing platform can be used to implement the product data engine 120, product data corpus 125, product description generation engine 130, anomaly prediction engine 140, order management engine 150, order data repository 160, as well as other elements of the product configuration validation platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the product configuration validation platform 110 to reside in different data centers. Numerous other distributed implementations of the product configuration validation platform 110 are possible.

Accordingly, one or each of the product data engine 120, product data corpus 125, product description generation engine 130, anomaly prediction engine 140, order management engine 150, order data repository 160 and other elements of the product configuration validation platform 110 can each be implemented in a distributed manner so as to comprise a plurality of distributed elements implemented on respective ones of a plurality of compute nodes of the product configuration validation platform 110.

It is to be appreciated that these and other features of illustrative embodiments are presented by way of example only, and should not be construed as limiting in any way. Accordingly, different numbers, types and arrangements of system elements such as the product data engine 120, product data corpus 125, product description generation engine 130, anomaly prediction engine 140, order management engine 150, order data repository 160 and other elements of the product configuration validation platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the product configuration validation platform can be offered to cloud infrastructure customers or other users as part of FaaS, CaaS and/or PaaS offerings.

Figure 17:
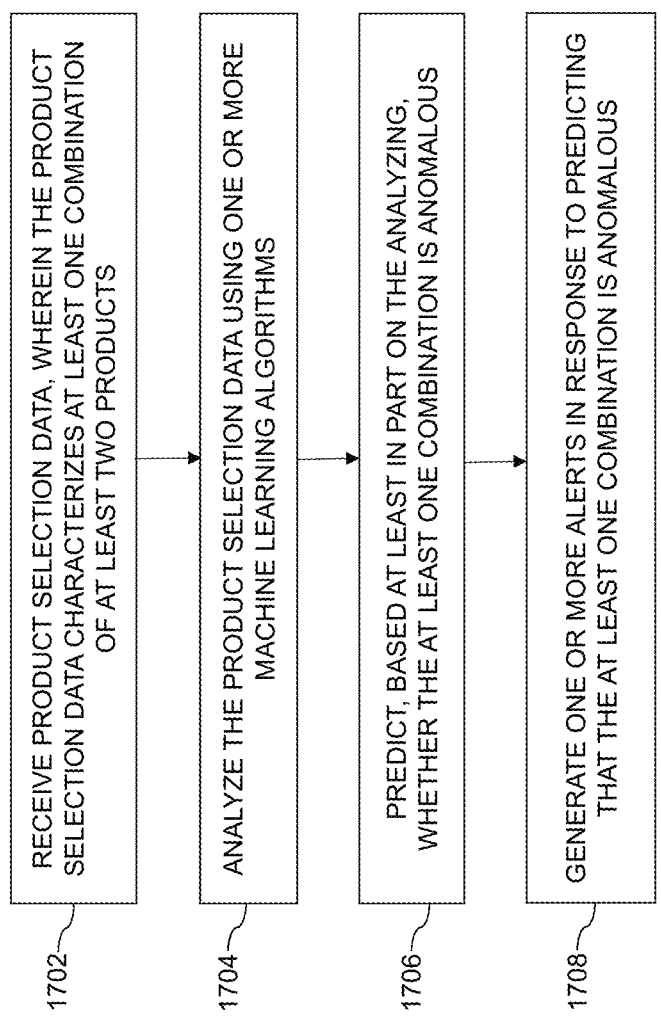
FIG. 17 depicts a process for product configuration validation according to an illustrative embodiment.

The operation of the information processing system 100 will now be described in further detail with reference to the flow diagram of FIG. 17. With reference to FIG. 17, a process 1700 for product configuration validation as shown includes steps 1702 through 1708, and is suitable for use in the system 100 but is more generally applicable to other types of information processing systems comprising a product configuration validation platform configured for proactive detection of product description and product combination issues.

In step 1702, product selection data characterizing at least one combination of at least two products is received by, for example, an anomaly prediction engine 140. In step 1704, the product selection data is analyzed using one or more machine learning algorithms.

In step 1706, based, at least in part, on the analyzing, a prediction is made whether the at least one combination is anomalous. The predicting comprises identifying the at least one combination as an outlier combination of at least a first product identifier and a second product identifier, wherein the one or more machine learning algorithms utilize an unsupervised learning technique to identify the at least one combination as an outlier combination. The one or more machine learning algorithms comprise an isolation forest algorithm trained with training data comprising historical product selection data. The historical product selection data comprises historical product combinations and one or more product attributes.

In step 1708, one or more alerts are generated in response to predicting that the at least one combination is anomalous. In illustrative embodiments, the product selection data comprises an order for the at least one combination, wherein the generating of the one or more alerts comprises activating a flag requesting review of the order prior to order fulfillment.

In illustrative embodiments, the method further comprises receiving product attributes data for at least one product, and generating, using at least one natural language generation algorithm, a description of the at least one product based, at least in part, on the product attributes data. The at least one natural language generation algorithm utilizes one or more transformers to generate one or more word combinations in the description. The at least one natural language generation algorithm utilizes one or more neural networks in combination with the one or more transformers to generate the one or more word combinations. The at least one natural language generation algorithm is trained with historical product description and attributes data.

In illustrative embodiments, the anomaly prediction engine 140 also receives product description and attributes data, and analyzes the product description and attributes data using the one or more machine learning algorithms. The anomaly prediction engine 140 predicts based, at least in part, on the analyzing of the product description and attributes data, whether one or more product descriptions are anomalous. One or more additional alerts are generated in response to predicting that the one or more product descriptions are anomalous. The one or more machine learning algorithms are trained with historical product description and attributes data.

It is to be appreciated that the FIG. 17 process and other features and functionality described above can be adapted for use with other types of information systems configured to execute product configuration validation services in a product configuration validation platform or other type of platform.

The particular processing operations and other system functionality described in conjunction with the flow diagram of FIG. 17 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 17 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a product configuration validation platform as disclosed herein can provide a number of significant advantages relative to conventional arrangements. For example, the product configuration validation platform uses machine learning to proactively predict anomalies or mismatches of various products selected as part of sales orders. For example, the embodiments utilize an isolation forest algorithm to detect outlier product combinations such as, but not necessarily limited to, product combinations of hardware, appliance or software products with service products. As an additional advantage, the embodiments generate alerts for unusual and/or misconfigured product configurations in real-time (e.g., during the sales process) to prevent fulfillment of unwanted orders.

The embodiments advantageously leverage an unsupervised learning approach and machine learning models to detect anomalies in product descriptions as well as product combinations. Responsive to identifying product descriptions which are inconsistent with corresponding product attributes, the embodiments generate alerts at the time of product data creation to avoid costly errors in the supply chain that may occur from incorrect product descriptions.

The embodiments further provide technical solutions which leverage state of the art NLP, NLU and NLG techniques by further training a pre-trained transformer with enterprise product data. Illustrative embodiments advantageously automatically generate product descriptions from inputted product attributes, thereby eliminating human configuration issues.

Unlike conventional approaches, illustrative embodiments provide technical solutions which formulate programmatically and with a high degree of accuracy, the detection of anomalies in product descriptions and product combinations. By utilizing historical product description and attribute data, and historical orders data corresponding to normal situations, and leveraging a sophisticated machine learning algorithm, anomalous product configurations are identified.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the product configuration validation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a product configuration validation platform in illustrative embodiments. These and other cloud-based systems in illustrative embodiments can include object stores.

Illustrative embodiments of processing platforms will now be described in greater detail with reference to FIGS. 18 and 19. Although described in the context of system 100, these platforms may also be used to implement at least portions of other information processing systems in other embodiments.

Figure 18:
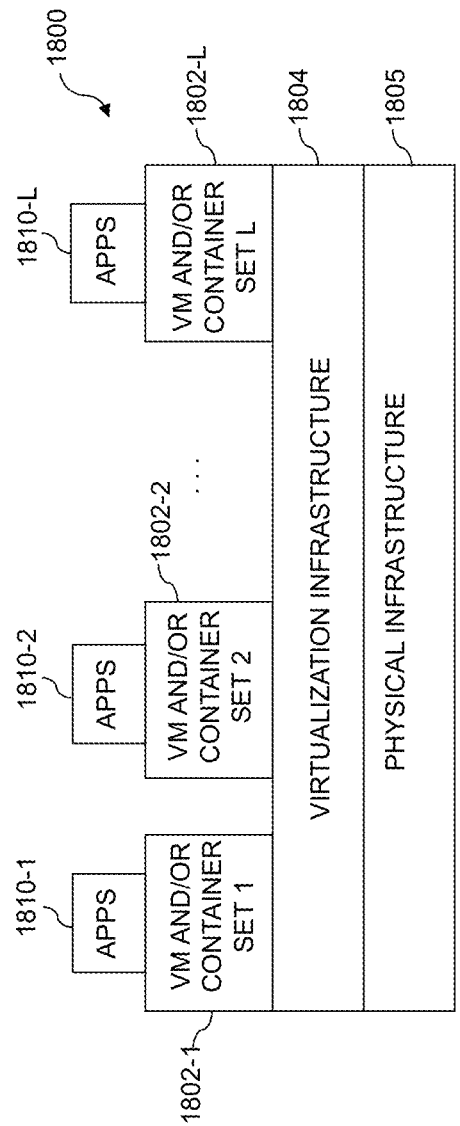
FIGS. 18 and 19 show examples of processing platforms that may be utilized to implement at least a portion of an information processing system according to illustrative embodiments.
Figure 19:
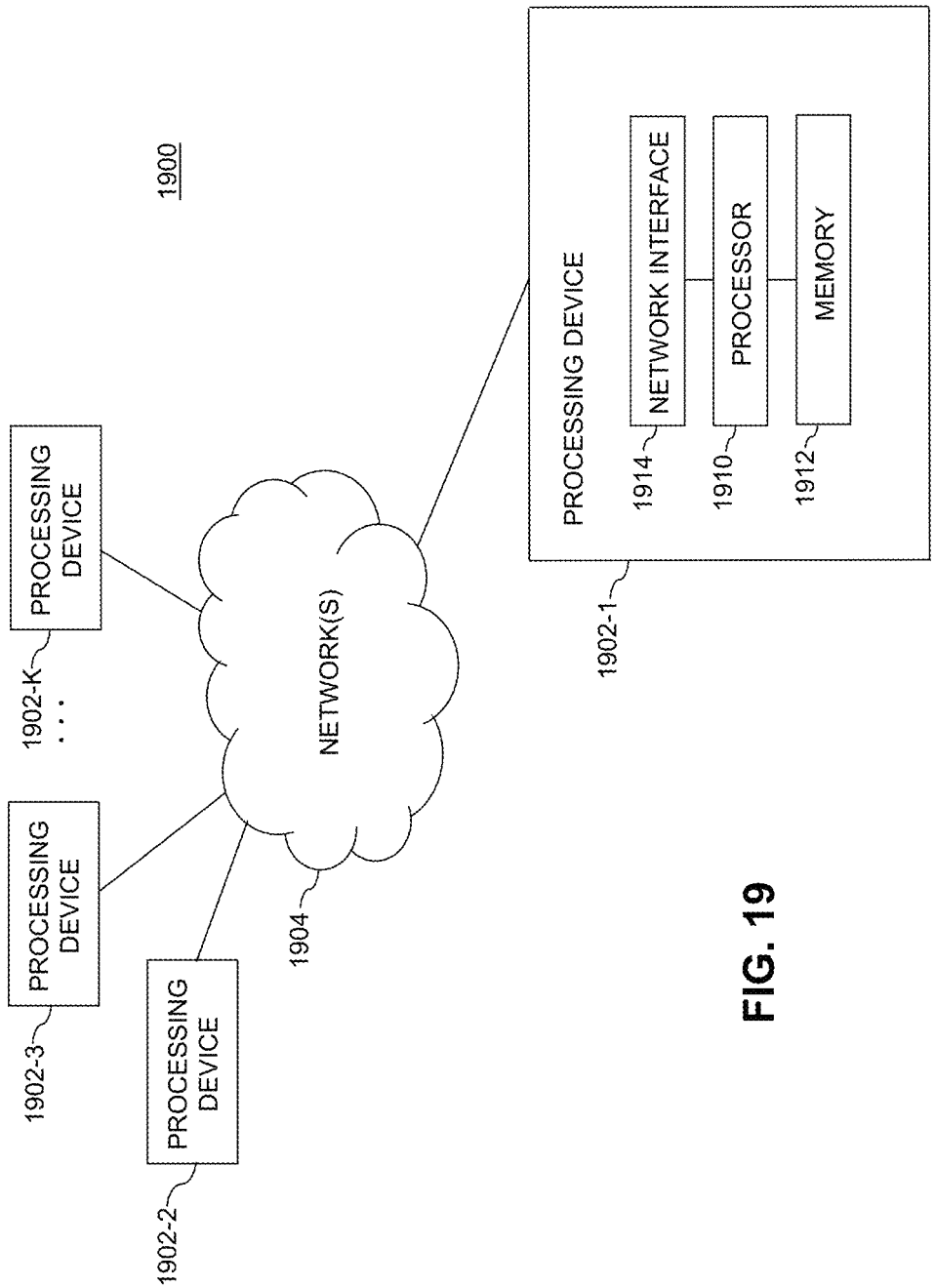

FIG. 18 shows an example processing platform comprising cloud infrastructure 1800. The cloud infrastructure 1800 comprises a combination of physical and virtual processing resources that may be utilized to implement at least a portion of the information processing system 100. The cloud infrastructure 1800 comprises multiple virtual machines (VMs) and/or container sets 1802-1, 1802-2, . . . 1802-L implemented using virtualization infrastructure 1804. The virtualization infrastructure 1804 runs on physical infrastructure 1805, and illustratively comprises one or more hypervisors and/or operating system level virtualization infrastructure. The operating system level virtualization infrastructure illustratively comprises kernel control groups of a Linux operating system or other type of operating system.

The cloud infrastructure 1800 further comprises sets of applications 1810-1, 1810-2, . . . 1810-L running on respective ones of the VMs/container sets 1802-1, 1802-2, . . . 1802-L under the control of the virtualization infrastructure 1804. The VMs/container sets 1802 may comprise respective VMs, respective sets of one or more containers, or respective sets of one or more containers running in VMs.

In some implementations of the FIG. 18 embodiment, the VMs/container sets 1802 comprise respective VMs implemented using virtualization infrastructure 1804 that comprises at least one hypervisor. A hypervisor platform may be used to implement a hypervisor within the virtualization infrastructure 1804, where the hypervisor platform has an associated virtual infrastructure management system. The underlying physical machines may comprise one or more distributed processing platforms that include one or more storage systems.

In other implementations of the FIG. 18 embodiment, the VMs/container sets 1802 comprise respective containers implemented using virtualization infrastructure 1804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1800 shown in FIG. 18 may represent at least a portion of one processing platform. Another example of such a processing platform is processing platform 1900 shown in FIG. 19.

The processing platform 1900 in this embodiment comprises a portion of system 100 and includes a plurality of processing devices, denoted 1902-1, 1902-2, 1902-3, . . . 1902-K, which communicate with one another over a network 1904.

The network 1904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1902-1 in the processing platform 1900 comprises a processor 1910 coupled to a memory 1912. The processor 1910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1912 may comprise random access memory (RAM), read-only memory (ROM), flash memory or other types of memory, in any combination. The memory 1912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1902-1 is network interface circuitry 1914, which is used to interface the processing device with the network 1904 and other system components, and may comprise conventional transceivers.

The other processing devices 1902 of the processing platform 1900 are assumed to be configured in a manner similar to that shown for processing device 1902-1 in the figure.

Again, the particular processing platform 1900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the product configuration validation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and product configuration validation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
receiving product selection data, wherein the product selection data characterizes at least one combination of at least two products and comprises an order for the at least one combination;
analyzing the product selection data using one or more machine learning algorithms;
predicting based, at least in part, on the analyzing, whether the at least one combination is anomalous;
activating one of a first flag identifying the at least one combination as normal and a second flag identifying the at least one combination as anomalous in response to the predicting, wherein order fulfillment is permitted in response to activation of the first flag, and the order fulfillment is prevented in response to activation of the second flag; and
generating one or more alerts including the second flag in response to predicting that the at least one combination is anomalous, wherein the one or more alerts include a request to review the order prior to the order fulfillment;
wherein the steps of the method are executed by a processing device operatively coupled to a memory.

2. The method of claim 1 further comprising:
receiving product attributes data for at least one product; and
generating, using at least one natural language generation algorithm, a description of the at least one product based, at least in part, on the product attributes data.

3. The method of claim 2 wherein the at least one natural language generation algorithm utilizes one or more transformers to generate one or more word combinations in the description.

4. The method of claim 3 wherein the at least one natural language generation algorithm utilizes one or more neural networks in combination with the one or more transformers to generate the one or more word combinations.

5. The method of claim 2 further comprising training the at least one natural language generation algorithm with historical product description and attributes data.

6. The method of claim 1 further comprising:
receiving product description and attributes data;
analyzing the product description and attributes data using the one or more machine learning algorithms;
predicting based, at least in part, on the analyzing of the product description and attributes data, whether one or more product descriptions are anomalous; and
generating one or more additional alerts in response to predicting that the one or more product descriptions are anomalous.

7. The method of claim 6 further comprising training the one or more machine learning algorithms with historical product description and attributes data.

8. The method of claim 1 wherein the predicting comprises identifying the at least one combination as an outlier combination of at least a first product identifier and a second product identifier.

9. The method of claim 8 wherein the one or more machine learning algorithms utilize an unsupervised learning technique to identify the at least one combination as an outlier combination of at least a first product identifier and a second product identifier.

10. The method of claim 1 wherein the one or more machine learning algorithms comprise an isolation forest algorithm.

11. The method of claim 1 further comprising training the one or more machine learning algorithms with training data comprising historical product selection data.

12. The method of claim 11 wherein the historical product selection data comprises historical product combinations and one or more product attributes.

13. An apparatus comprising:
a processing device operatively coupled to a memory and configured:
to receive product selection data, wherein the product selection data characterizes at least one combination of at least two products and comprises an order for the at least one combination;
to analyze the product selection data using one or more machine learning algorithms;
to predict based, at least in part, on the analyzing, whether the at least one combination is anomalous;
to activate one of a first flag identifying the at least one combination as normal and a second flag identifying the at least one combination as anomalous in response to the predicting, wherein order fulfillment is permitted in response to activation of the first flag, and the order fulfillment is prevented in response to activation of the second flag; and to generate one or more alerts including the second flag in response to predicting that the at least one combination is anomalous, wherein the one or more alerts include a request to review the order prior to the order fulfillment.

14. The apparatus of claim 13 wherein the processing device is further configured:

to receive product attributes data for at least one product; and to generate, using at least one natural language generation algorithm, a description of the at least one product based, at least in part, on the product attributes data.

15. The apparatus of claim 14 wherein the at least one natural language generation algorithm utilizes one or more transformers to generate one or more word combinations in the description.

16. The apparatus of claim 13 wherein the processing device is further configured:

to receive product description and attributes data;

to analyze the product description and attributes data using the one or more machine learning algorithms;

to predict based, at least in part, on the analyzing of the product description and attributes data, whether one or more product descriptions are anomalous; and to generate one or more additional alerts in response to predicting that the one or more product descriptions are anomalous.

17. An article of manufacture comprising a non-transitory processor-readable storage medium having stored therein program code of one or more software programs, wherein the program code when executed by at least one processing device causes said at least one processing device to perform the steps of:

receiving product selection data, wherein the product selection data characterizes at least one combination of at least two products and comprises an order for the at least one combination;

analyzing the product selection data using one or more machine learning algorithms;

predicting based, at least in part, on the analyzing, whether the at least one combination is anomalous;

activating one of a first flag identifying the at least one combination as normal and a second flag identifying the at least one combination as anomalous in response to the predicting, wherein order fulfillment is permitted in response to activation of the first flag, and the order fulfillment is prevented in response to activation of the second flag; and generating one or more alerts including the second flag in response to predicting that the at least one combination is anomalous, wherein the one or more alerts include a request to review the order prior to the order fulfillment.

18. The article of manufacture of claim 17 wherein the program code further causes said at least one processing device to perform the steps of:

receiving product attributes data for at least one product; and generating, using at least one natural language generation algorithm, a description of the at least one product based, at least in part, on the product attributes data.

19. The article of manufacture of claim 17 wherein the program code further causes said at least one processing device to perform the steps of:

receiving product description and attributes data;

analyzing the product description and attributes data using the one or more machine learning algorithms;

predicting based, at least in part, on the analyzing of the product description and attributes data, whether one or more product descriptions are anomalous; and generating one or more additional alerts in response to predicting that the one or more product descriptions are anomalous.

20. The article of manufacture of claim 18 wherein the at least one natural language generation algorithm utilizes one or more transformers to generate one or more word combinations in the description.

* * * * *